United States Patent

Beaton et al.

[11] Patent Number: 5,815,238
[45] Date of Patent: Sep. 29, 1998

[54] SCANNING LASER DEMOLDING OF OPHTHALMIC LENSES

[75] Inventors: Stephen R. Beaton, Neptune Beach; Denwood F. Ross, Green Cove Springs; Craig W. Walker, Jacksonville, all of Fla.

[73] Assignee: Johnson & Johnson Vision Products, Inc., Jacksonville, Fla.

[21] Appl. No.: 709,832

[22] Filed: Sep. 10, 1996

[51] Int. Cl.⁶ .............................. G02C 7/02; B29D 11/00; B28B 1/00
[52] U.S. Cl. ...................... 351/177; 425/174.4; 425/808; 264/1.7; 264/2.7; 351/178
[58] Field of Search ................................... 351/177–178; 264/1.7, 2.7; 428/174.4, 808

[56] References Cited

U.S. PATENT DOCUMENTS 5,294,379  3/1994  Ross et al. ............................ 264/1.4
5,417,557  5/1995  Ross et al. ............................ 425/143

*Primary Examiner*—Frank G. Font
*Assistant Examiner*—Jason D. Vierra-Eisenberg

[57] ABSTRACT

An apparatus and method for removing a molded ophthalmic lens from between the mold portions in which it is produced. A source of intense electromagnetic radiation is applied to at least one of the mold portions in a predetermined scanning pattern through the intermediary of galvanometer-driven mirrors. Differential expansion of the heated mold polymer relative to the cooler polymer shifts one surface with respect to the other, and the shear force breaks the polymerized lens/polymer mold adhesion and assists in the separation of mold portions. The greater the temperature gradient between the surfaces of the mold portions, the greater the shearing force and the easier the mold portions separate. The heated back mold portion is promptly removed so that very little energy is transferred to the polymer lens, avoiding the possibility of thermal decomposition of the lens.

29 Claims, 5 Drawing Sheets

SCANNING LASER DEMOLDING OF OPHTHALMIC LENSES

BACKGROUND OF THE INVENTION

1. Field of the Invention

The present invention relates to a method and apparatus for the improved removal of molded ophthalmic lenses from the mold in which they are produced. In particular, this invention is suited to molded ophthalmic lenses such as hydrogel contact lenses, although the method is also adaptable to the molding methods employed in connection with other small, high-precision ophthalmic lenses, such as intraocular lenses.

The phenomenal growth of the industry which is engaged in the manufacture of the evermore popular ophthalmic contact lenses, especially the aspects of the industry which pertain to the supplying of contact lenses which are intended for frequent periodic replacement by a wearer, has dramatically increased the need for the mass-production of immense quantities of such lenses which are of a consistently high quality while being inexpensive to produce. Consequently, commensurate with the foregoing needs of the industry, this has necessitated manufacturers of such lenses to strive for the development of automated methods and apparatuses which are particularly adaptable to high-speed automated production practices, and which perform with consistency at adequate degrees of accuracy or precision in a highly cost-effective and consequently economically viable manner.

Pursuant to the currently developed technology which is concerned with the production of ophthalmic lenses, particularly such as soft contact lenses of the hydrogel type, there is normally utilized a monomer or monomer mixture which is polymerizable in a plastic mold. Generally, although not necessarily, the material for the ophthalmic contact lenses is selected from a suitable hydrophilic material, preferably a monomer to form a so-called HEMA-based polymer (hydroxyethylmethacrylate), although other suitable polymerizable monomers may also be employed for the lenses, as discussed further on hereinbelow.

2. Discussion of the Prior Art

Direct molding processes or methods which are typically employed pursuant to the current state-of-the-art for the forming of soft hydrogel ophthalmic contact lenses may be readily found; for example, in the disclosures of U.S. Pat. Nos. 5,080,839 to Larsen; 5,039,459 to Larsen, et al.; 4,889,664 to Larsen, et al.; and 4,495,313 to Larsen. As elucidated in the above-mentioned U.S. patents, the processes for the forming of the soft ophthalmic contact lenses may include the steps of dissolving a monomer mixture and a non-aqueous, water-displaceable solvent, and thereafter placing the monomer and solvent mixture in a mold providing a mold cavity which is in the configuration of the finally desired hydrogel contact lens. Subsequently, the monomer and solvent mixture is subjected to physical conditions causing the monomer or monomers to polymerize, thereby producing a polymer and solvent mixture in the shape of the final hydrogel contact lens. After completion of the foregoing procedure, the solvent is displaced with water in order to produce a hydrated lens whose final size and shape are similar to the configuration of the original molded polymer and solvent article.

Basic molds which are utilized for receiving the polymerizable monomer feed material for the forming of the lenses are disclosed, for example, in U.S. Pat. Nos. 5,094,609 to Larsen; 4,640,489 to Larsen, et al.; and 4,565,348 to Larsen. Ordinarily; for instance, as disclosed in U.S. Pat. No. 4,640,489, the mold which is employed consists of a two-piece mold having a female or front mold portion with a generally concave lens surface, and a male or back mold portion having a generally convex lens surface; and which is adapted to mate with the female mold portion, with both mold portions being preferably constituted of a thermoplastic material, such as polystyrene. As disclosed in the above-mentioned U.S. patent, polystyrene and copolymers thereof is considered to be a preferred mold material inasmuch as it does not crystallize during cooling of the hot melt which is utilized to form the lenses, and consequently exhibits little or no shrinkage when subjected to the processing conditions necessitated during the direct molding process, as discussed hereinabove. Alternatively, there may also be used suitable molds which are constituted of polypropylene or polyethylene; in essence, such as are described in specific detail in the disclosure of U.S. Pat. No. 4,121,896.

During the implementation of the molding process, the monomer and monomer mixture is supplied in an excess amount to the concavity of the concave female mold portion prior to the mating of the female and male mold portions. During the assembly of the male and female mold portions, which would conjointly define therebetween the lens-forming cavity between the concave and convex mold portions of the mold, and also provide for a perimetral lens edge, excess monomer or monomer mixture is expelled or squeezed out from the mold cavity and comes to rest on a flange or between flanges which surround one or both of the mated mold portions. Upon polymerization, this excess material which is derived from the monomer or monomer mixture produces an annular flange or ring of the HEMA-based material which is employed for producing each of the contact lenses so as to extend about the formed lens externally of the mold cavity between the flange structure of the mated male and female mold portions. In accordance with the disclosures of the above-referenced U.S. Pat. Nos. 5,039,459; 4,889,664; and 4,565,348, there is set forth the requirement that the materials for the mold and lens, and the chemistry and physical processes which are implemented during the molding sequence be controlled in a manner whereby the mated mold portions may be readily separated without the necessity for having to apply an undue force, which at times may be necessitated when the molded lens adheres to the lens mold, or in the event that the mated mold portions exhibit a tendency to stick to each other subsequent to the polymerization of the lens material.

Taking the foregoing into consideration, the processes pursuant to the prior art which are employed for separating the mold portions and for removing the molded lens therefrom, essentially comprise a preheating stage, a heating stage, and a physical or mechanical prying open and separating of the mold portions, and thereafter a lens removal procedure. The preheating and/or heating stage employed in the above mold separating and lens removal process contemplates the provision of applying heat to the back mold portion, normally the male or convex mold portion, generally through the application of a heated air stream, by means of convection. Inasmuch as a resultant differential expansion of the heated mold polymer material relative to the cooler lens polymer material produces a tendency to shift one surface with respect to the other, the prying force which is applied breaks the adhesion between the polymerized lens and contiguous polymer mold, and assists in the separation of the mold portions. The more extensive the temperature gradient between the surfaces of the mold portions, the greater becomes the shearing force which is generated, and the easier it becomes for the mold portions to be separated. This effect is at its greatest in the presence of a maximum thermal gradient.

More recent techniques which have been developed, or are currently in the process of being developed for the achieving of a temperature gradient between the male (back) lens mold portion and the contact lens, include processes involving laser lens demolding technology, such as is described in copending U.S. patent application No. 08/431,552 (Attorney Docket No. 8999Z, VTN-0075), which is assigned to the common assignee of the present application; or through the implementation of steam impingement in order to generate the necessary temperature gradient, as described herein and in copending U.S. patent application No. 08/258,265 (Attorney Docket No. 9006, VTN-0082); which is also assigned to the common assignee of the present application; and wherein the disclosures of the above-identified applications are incorporated herein by reference.

At the present time, the procedure of physically prying apart the mated lens mold portions which contain the polymerized contact lens in a molding cavity which is located therebetween is adapted to be accomplished by the application of mechanical leverage, whereby the leverage or prying action may be implemented automatically from one side of the mated lens mold portions.

For example, the disclosure of U.S. Pat. No. 4,889,664, referred to hereinabove, discloses a test fixture which is employed to measure the forces which are required in order to open or separate the mated mold portions. The test fixture discloses a holding fixture for retaining the bottom half of the lens mold, and a lever structure which is positionable between the top mold half portion and the bottom mold half portion, and which engages the former so as to enable prying the top half mold portion away from the bottom half mold portion at a controlled rate of mold separation. Generally, such lever structure for prying apart the lens mold portions consists of a plurality of prying fingers which engage beneath the flange structure encompassing the upper mold half portion, the latter of which generally defines the back curve of the lens which is being molded, and the vertical lifting force imparted to the upper mold half portion by the therewith engaged prying fingers is normally sufficient to disengage the mating mold portions so as to enable separation thereof and afford access to the contents of the mold cavity; in effect, the molded ophthalmic contact lens. Since the prying is ordinarily effected from one side of the flange structure of the upper or back curve mold half portion, and the opposite side is unsupported, the back mold half portion tends to pivot on the bottom or front curve mold portion so as to squash the material at the edge of the lens contained therebetween. This is potentially a source of possible damage being imparted to the contact lenses during mold separation, rendering the lenses unusable and the lens manufacturing process economically not viable for mass production techniques.

Another version of the mechanical prying apart of such mating mold half portions, and which facilitates this procedure at a reduced application of force, while concurrently potentially preventing or at least appreciably ameliorating the extent of any possible sticking together of the mold half portions, with the mechanical leverage applied to the upper mold half portion, in addition to the application of the heating action thereto, either through steam or laser impingement, contemplates imparting a motion to the prying finger relative to the perimeter of the upper mold half contacted thereby so as to apply a predetermined pattern of motion to the prying fingers engaging the flange of the upper mold half while concurrently effectuating the lifting action, as is described in copending U.S. patent application No. 08/257,871 (Attorney Docket No. 9008; VTN-84). This, in essence, causes the upper mold half portion to be gradually separated from the lower mold half portion at a controlled varying rate and at a specified angular orientation therebetween, ensuring that the separation between the mated mold half portions may be implemented in the most advantageous and expedient manner, while concurrently reducing or even completely inhibiting the danger of any potential damage being encountered by the mold half portions and the molded lens in carrying out this particular lens demolding procedure.

A particular problem which is encountered pertains to the aspect that the mold portions usually are surrounded by a flange, and the monomer or monomer mixture is supplied in excess to the concave mold portion prior to the mating of the molds. After the mold portions are placed together, defining the lens and forming an edge, the excess monomer or monomer mixture is expelled from the mold cavity and rests on or between the flange of one or both mold portions. Upon polymerization this excess material forms an annular flange or ring around the formed lens.

Reiterating the aspects of the foregoing method for separating the mold portions and removing the lens, this basically consists of preheating, heating, prying and removal. Hot air provides the heating, mechanical leverage the prying, and the removal is manual. Heating the mold by convection is not an efficient heat transfer technique, since from the time a mold enters the heating apparatus until the back mold portion is completely removed requires on the order of one minute.

A current method for removing the lens is to apply heat to the back mold portion by means of a heated air stream. The heating of the back mold portion is done in two steps: a preheat stage and a heat/pry stage. In the heat/pry stage the mold is clamped in place and pry fingers are inserted under the back mold portion. A force is applied to each back mold portion during a heating cycle. When the required temperature has been reached, the back mold portion breaks free and one end is lifted by the pry fingers. After the back mold portion has been detached from the front mold portion on at least one side, the mold then exits the heater. The back mold portion and the annular flashing is then totally removed.

It is also possible to impinge hot or cold air on the outer surface of the front mold portion, to achieve other thermal gradients. The heated air is blown on the exterior of the back mold portion where it transfers heat to the upper surface of the lens. Heat is transported through the back mold, the molded lens, and front mold by thermal diffusion. While the aforementioned method has some efficacy in assisting the removal of the lens between the mold portions, the temperature gradient achieved from the heated back mold portion, across the lens to the front mold portion is relatively small. The shortcomings in this approach result from the way heat is delivered to the mold portion. The constant temperature air stream heats the exterior surface of the back mold portion more rapidly, while thermal conduction transfers heat to the lens surface. The only way to increase the thermal gradient is to transfer heat faster, but this would cause the back mold portion to become too soft for the lifting pry fingers to engage.

As stated above, this method has not been entirely satisfactory because the thermal gradient induced is not sufficient to fully and repeatedly separate the mold portions.

The above-mentioned laser demolding method, as is described; for instance, in U.S. Pat. No. 5,294,379, issued on Mar. 15, 1994, which is commonly assigned to the assignee of the present application, and the disclosure of which is incorporated herein by reference, utilizes a source of electromagnetic radiation, preferably a carbon dioxide ($CO_2$) laser, applied to at least one of the mold portions. The laser is in a range of wavelengths of between about $1\mu$ and $20\,\mu m$, and preferably at a wavelength of $10.6\,\mu m$. The exposure of the mold portion to the laser is between 0.4 second and one second, and necessitates a 373 Watt laser for the heating of 8 molds.

Because differential expansion of the heated mold polymer relative to the cooler lens polymer shifts one surface with respect to the other, the shear force breaks the polymerized lens/polymer mold adhesion and assists in the separation of mold portions. The greater the temperature gradient between the surfaces of the mold portions, the greater the shearing force and the easier the mold portions separate. This effect is greatest when there is present a maximum thermal gradient. As time continues, heat is lost through conduction from the back mold portion into the lens polymer and the front mold portion, and then collectively into the surrounding environment. The heated back mold portion is, therefore, promptly removed so that very little energy is transferred to the polymer lens, avoiding the possibility of thermal decomposition of the lens.

Lasers are typically the most intense sources available, and hence, maximize the efficiency of energy transfer from source to workpiece. "Intense" refers not to the total output of the source, but rather the concentration of its energy. Other intense electromagnetic energy sources capable of heating with efficiency and rapidity, such as microwave generators, can be used. The characteristic shared by these sources, defined as intense, is that the area covered by the output at the distance to the workpiece is on the order of the area of the workpiece.

Also, because of the absorptive nature of the mold material at these frequencies, most of the laser energy is absorbed within several wavelengths travel into the material. From that point, heat is transferred only by conduction from the surface. For that reason, on initial exposure to the laser beam, a huge thermal gradient is formed between the exposed exterior surface and the surface of the mold portion in contact with the lens. Moreover, non-uniform heating can also be caused by a non-homogeneous energy density across the laser beam.

Although the foregoing demolding effected through the intermediary of radiation energy, particularly such as a laser, is generally satisfactory, some problems have been encountered in that there is a non-uniform heating implemented in the various mold portions or surface areas due to the differences in thickness and the curvatures encountered by the laser.

SUMMARY OF THE INVENTION

In order to improve upon the foregoing and to ameliorate or even completely eliminate the problems encountered in current laser demolding apparatuses and methods, such as described hereinabove, the present invention contemplates the utilization of a scanner arrangement, particularly the use of an X-Y scanner comprising galvanometer-driven mirrors, which moves small laser spot; for example, to the extent of 0.8 mm in diameter, which will cause the laser to trace spiral or checkered patterns or other suitable patterns of predetermined duration in time over the surface areas of the mold portions and lens. The laser beam is narrowed or focused down to the 0.8 mm diameter prior to striking the mirrors which are mounted to and driven by the galvanometers. The galvanometers, two of which are required; i.e. one for each mirror, then move the mirrors to direct the beam in its predetermined pattern across the surface of the mold part; in essence, the base curve. Preferably, the mirrors are constituted of a metal, such as beryllium, which is able to withstand the high amount of energy typically provided by $CO_2$ lasers. This, in effect, will vary the amount of energy imparted to different areas and is useful in reducing the energy at locations or surface area portions where the lens is thin or where absorption by the material of the lens or mold parts, such as the thermoplastic involved, varies in its intensity by virtue of acute or changing surface angles encountered by the laser spot.

Thus, by imparting controlled surface patterns over the mold portions by means of the laser due to the use of the scanner, the temperature rise may be controlled to a more precise degree in the distribution over the surface than heretofore, and which will resultingly eliminate any formation of so-called hot spots which could conceivably damage the lens during the demolding procedure.

Furthermore, another aspect which provides for the advantageous use of the galvanometer-driven mirror X-Y scanner in the implementation of scanning laser demolding the components through the intermediary of a laser scanning pattern, resides in that it enables the scanning of a plurality of lenses; for example, eight lenses contained in molds arranged on a single pallet, at a single work station rather than having to employ motion devices for moving the pallet from position to position for individually laser demolding each lens.

While a $CO_2$ laser, producing radiation in the mid-infrared range at a wavelength of 10.6 microns can be used, it is also possible to use a high powered UV laser or a high intensity electromagnetic radiation emitter of any type where the radiation produced is absorbed by the mold material sufficiently to cause an increase in mold material temperature.

Accordingly, it is an object of the present invention to provide a novel laser demolding apparatus wherein the use of a scanner facilitates selectively traced spiral patterns, concentric circles, overlapping spirals, circular rasters, checkered patterns or any other suitable scan paths to vary the amount of energy imparted to different lens mold surface areas.

A more specific object of the present invention resides in the provision of a galvanometer-driven mirror X-Y scanner system which causes a small laser spot to trace predetermined scan patterns successive over mold portions arranged on a stationary pallet or support, which will controllably vary the amount of radiation energy imparted to various mold surface areas of each of the mold portions.

Still another object of the present invention is to provide a method of providing for the controlled laser demolding of ophthalmic lenses in which the laser is controlled by means of a scanner system so as to trace the predetermined patterns to vary the amount of energy imparted to different areas.

Yet another object of the present invention is to provide an apparatus as described herein in which predetermined patterns may be traced by a laser scanner incorporating galvanometer-driven mirrors controlling the laser spot directed against the mold surfaces so as to control the intensity of radiation and heating of the surfaces of the lens and mold parts.

BRIEF DESCRIPTION OF THE DRAWINGS

Reference may now be had to the following detailed description of a preferred embodiment of the invention, taken in conjunction with the accompanying drawings; in which.

DETAILED DESCRIPTION OF A PREFERRED EMBODIMENT

Figure 1:
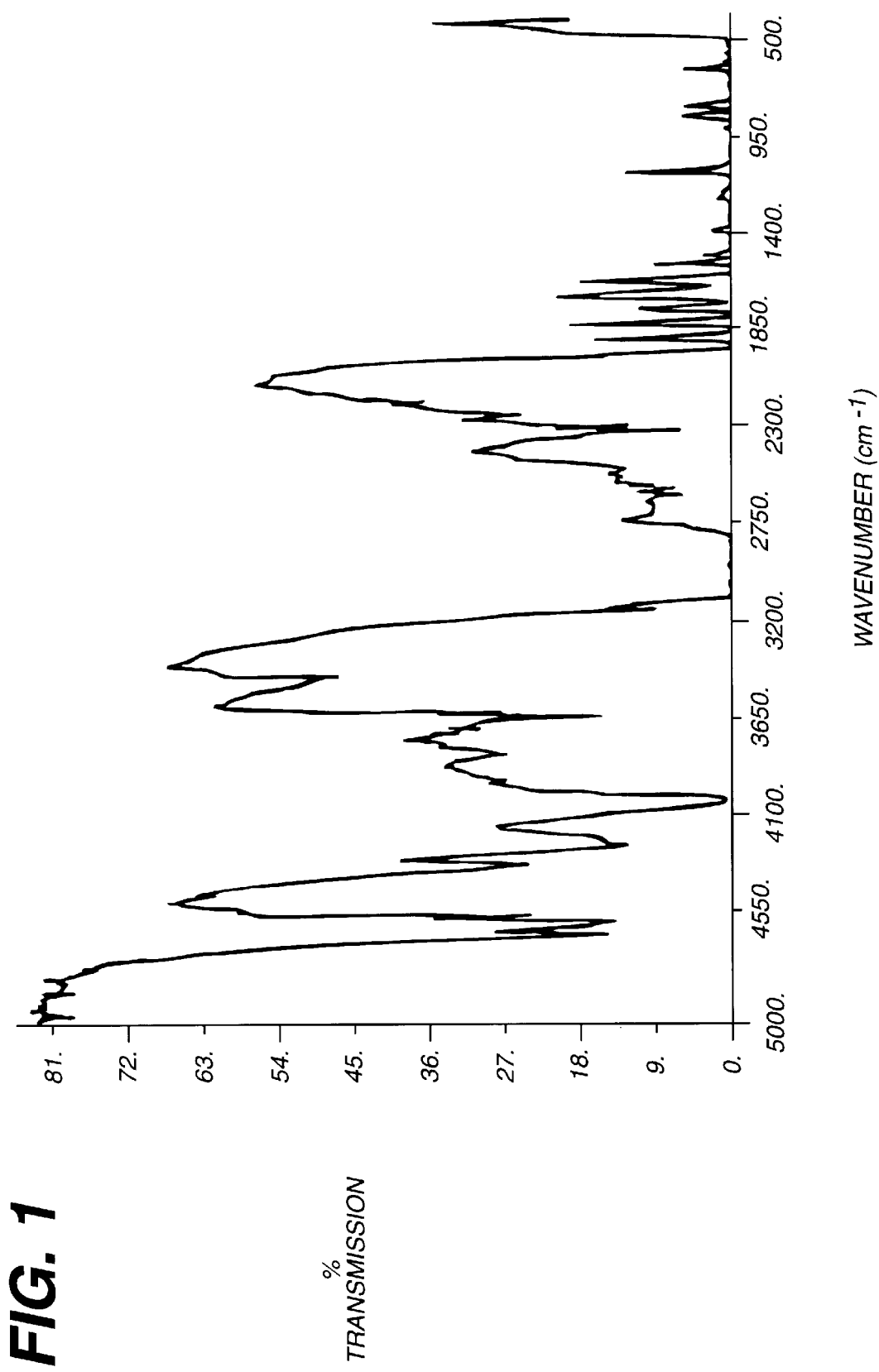
FIG. 1 illustrates a graphical representation of the radiation transmission of polystyrene as a function of wavenumber in the infrared range.

The absorption of radiation by a 1 mm polystyrene plate in the infrared spectrum is shown in FIG. 1. For the $CO_2$ laser described above, the 10.6 micron wavelength of the radiation produced has a corresponding (reciprocal) wavenumber of 943.3 $cm^{-1}$.

Heretofore, as also described in the previous patent application, a laser demolding system employed special optics in order to generate an intergrated laser intensity at the target, in essence, at the mold portion. Generally, the mold portions were supported on a pallet which was continuously moved past a laser spot fixedly directed at a work station, whereby in order to utilize the laser system to heat eight target lenses or mold portions which are supported on a pallet this necessitated the use of a relatively large and consequently expensive laser; for example a laser necessitating 373 watts in order to heat eight mold portions or ophthalmic lenses.

In contrast with the foregoing, the inventive scanning laser system focuses a basic laser beam down to a final spot diameter size, prior to the beam striking against a pair of mirrors which are mounted on galvanometers. The mirrors are adapted to be moved in, respectively, X and Y directions responsive to actuation by the galvanometers, the latter of which are microprocessor-controlled so as to direct the laser beam in a predetermined pattern or scan across the surface of successively each mold portion.

Figure 2:
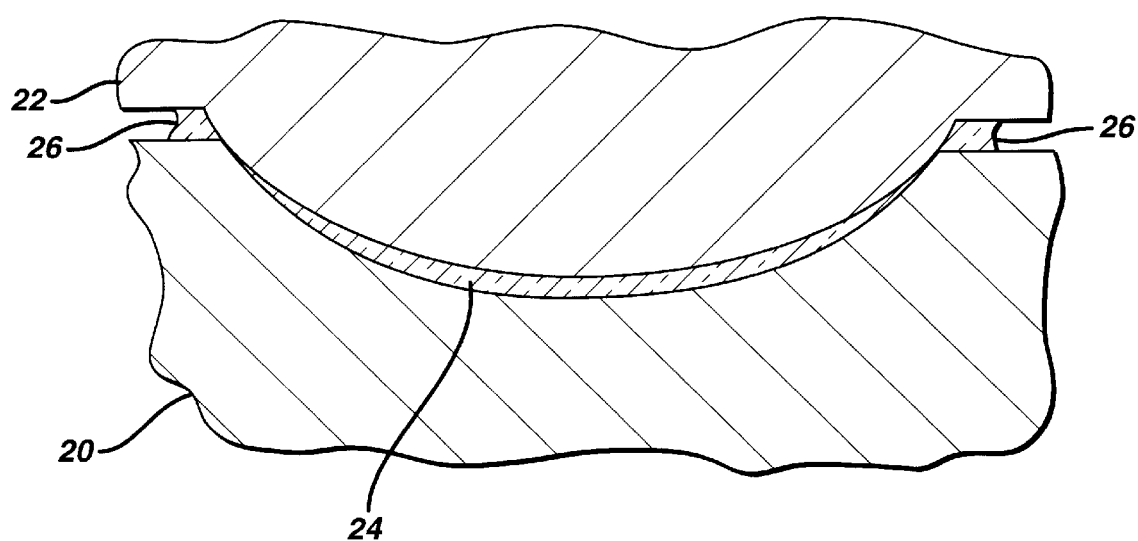
FIG. 2 illustrates a cross-sectional view of a molded ophthalmic lens contained between two mold sections.

Referring to FIG. 2, there is shown, in cross-section, a pair of mated mold portions with a lens therebetween. The mold portions are comprised of a front portion 20 and a back portion 22, preferably of polystyrene material. Between these two mold portions is lens 24 and an excess polymer ring 26 outside the cavity of the mold that forms the lens.

The temperature difference between identical locations on the front and back mold portions can be as much as 35° C., greatly facilitating the removal of the back mold portion from the front mold portion and the lens. Prior art methods of heating the back mold portion by using a heated fluid resulted in a temperature difference of approximately 3° to 5° C. and required on the order of one half to one and one-half minutes to achieve the maximum temperature difference.

If a lens/mold combination was overexposed to the laser energy, separation of the mold portions and removal of the lens would again be difficult. Mold damage would result such as oxidizing and melting (softening), and loss of mold rigidity would frustrate mold separation. In addition, overexposure thermally degrades the lens.

Figure 3:
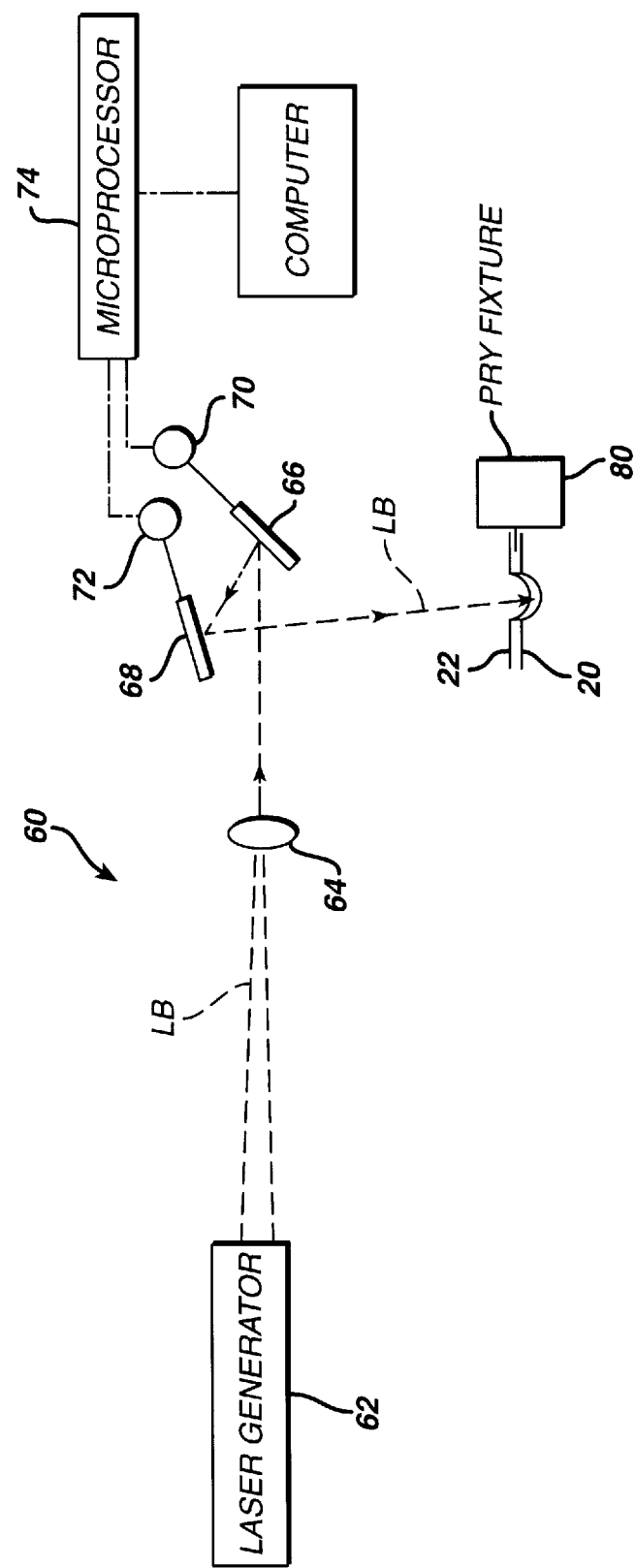
FIG. 3 illustrates, generally schematically, an optical train and galvanometer-driven focusing mirrors of the scanning laser system pursuant to the present invention.

Referring to FIG. 3 of the drawings, there is disclosed the inventive scanning laser system 60.

A laser generator 62 directs a laser beam LB through a focusing lens 64 or optics which focuses the beam L into a size down to a final diameter; preferably such as 0.8 millimeter. Upon the beam being focused at the output side of the focusing lens or optics 64, the beam strikes a first high energy mirror 66, preferably constituted of metal, such as beryllium, and from which it is then redirected, for example, towards the back curve 22 of a mold by a second high energy mirror 68 which is also constituted of metal such as beryllium. In order to be able to form a laser scan pattern and to redirect the beam from a first mold portion to a subsequent mold portion located on a pallet or support (not shown), each of the mirrors 66, 68 is adapted to be, respectively, displaced in a suitable x and y direction by means of a pair of driving galvanometers 70, 72 to each of which one of the respective mirrors is fastened, and whereby motion is imparted to the galvanometers 70, 72 by a suitable computer-programmed microprocessor 74 in a predetermined controlled manner.

Thus, a suitable laser scanning pattern is imparted to each mold portion; for example, in a circular pattern, checkered pattern, overlapping spirals, circular rasters or any other suitable pattern adapted to impart the desired amount of heat to the various mold portion surface areas prior to passing on to a subsequent or successive mold portion which is located on the stationary pallet at the particular laser scanning work station.

The foregoing concept of utilizing the scanning laser system 60 incorporating the galvanometer-driven mirrors 66, 68, affords a considerable reduction in wattage; for example, only 203 Watts being required from the laser to deliver the required amount of energy in 1.2 seconds. Thus, by moving the laser spot very rapidly, the mold material is heated rather than cut, and the galvanometer can accurately move the beam LB at speeds of over 1,000 inches per second.

In order to improve upon the distribution of the temperature produced by the laser beam over the mold portion surface areas and thereby avoid the formation of hot spots or inadequate temperature differentials which would adversely affect the quality of the ophthalmic lens, there is provided the (schematically illustrated) X-Y laser scanner system 60 incorporating the galvanometer-driven mirrors 66, 68, which forms a small movable laser spot, for example of the size of 0.8 mm. The scanner enables the laser spot to trace spiral patterns, checkered patterns, circular scans, overlapping spirals or any suitable scan paths over the surface areas of each mold portion 22 which varies the amount of energy imparted to different areas and is useful in reducing energy where the lens is thin or where absorption of the plastic material of the lens or mold portion may extensively vary due to acute surface angles which are impinged by the laser beam. This, in essence, enables the controlled formation of scan patterns, thereby providing for required amounts of heating of various surface portions in order to provide the appropriate temperature differentials in order to obtain the maximum separation effect between the mold halves or components while maintaining the integrity and quality of the ophthalmic lens.

Figure 4:
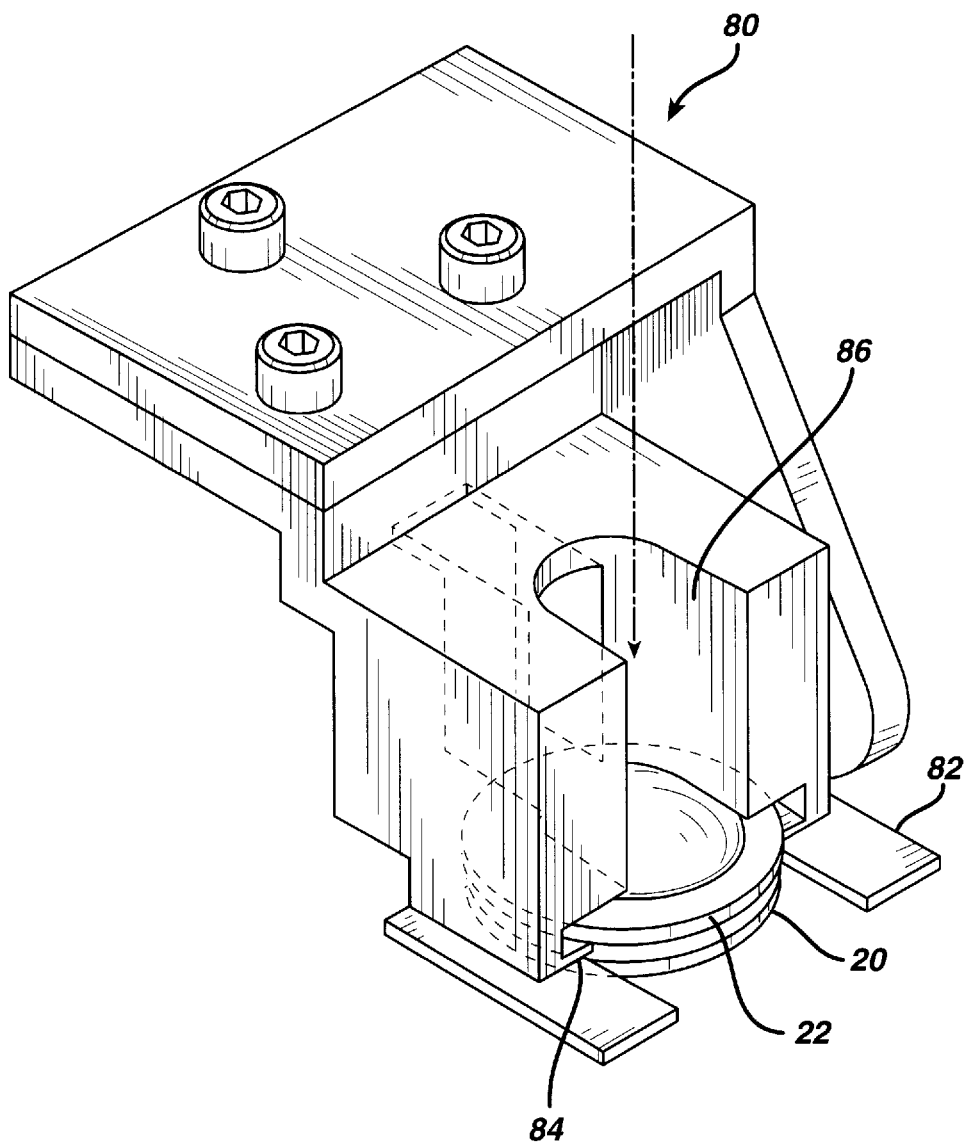
FIG. 4 illustrates a perspective generally diagrammatic view of a fixture apparatus for separating mold portions pursuant to the invention.
Figure 5:
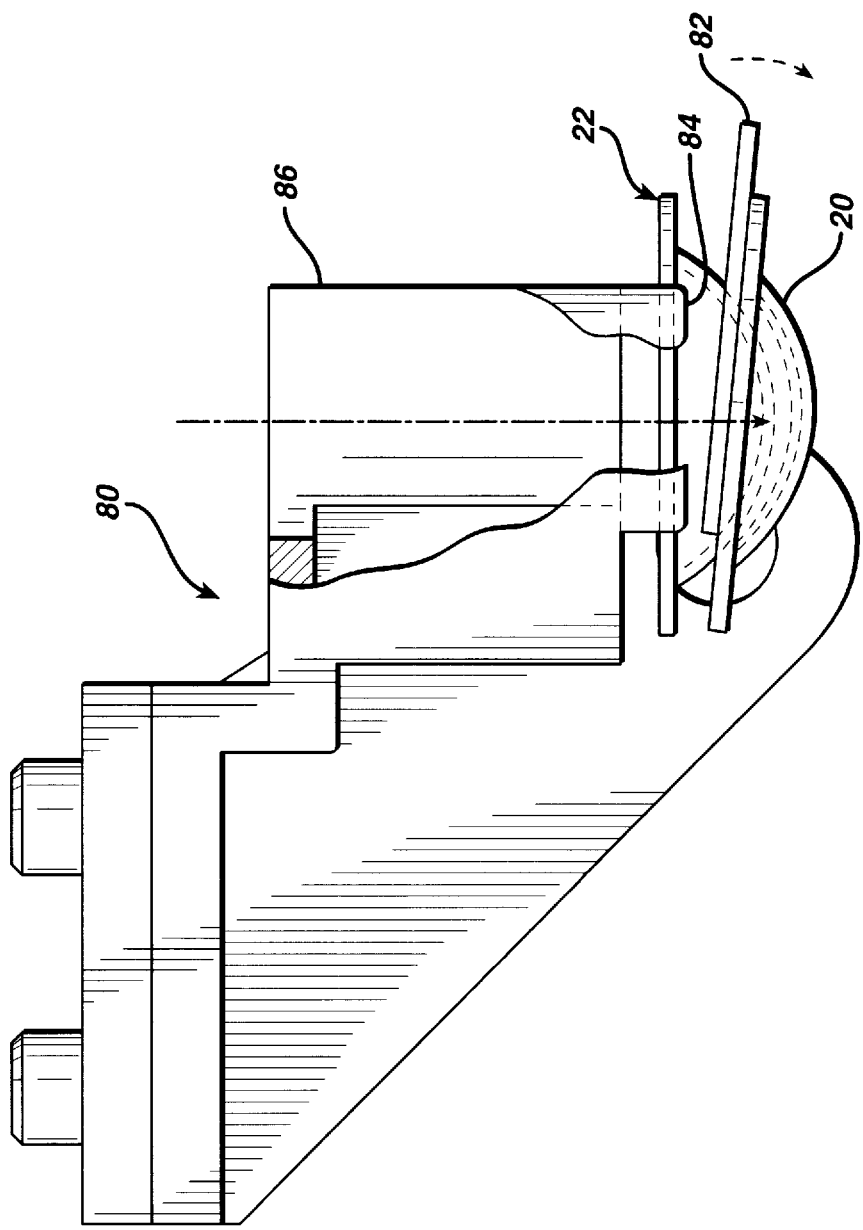
FIG. 5 illustrates a side elevational view of the fixture apparatus of FIG. 4, shown in the position after the mold portions have been separated.

The lens/mold combination can be positioned in a conventional manner by holding one or both mold portions (with the lens therebetween) in a fixture shown in FIGS. 4 and 5. The primary requirement of this fixture, beyond mechanical stability, is not to interfere with the beam of electromagnetic radiation. This is the reason it is preferred to hold the lens/mold combination by only the first mold portion and irradiate the second mold portion.

Shown in FIGS. 4 and 5 are a lens/mold combination identified in FIG. 2 as elements 20, 22 and 24, and holding fixture 80. This lens/mold combination is comprised of the front mold portion and back mold portion with the lens located therebetween, as identified in FIG. 2.

For the described system, only the back mold portion 22 is heated by exposure to radiation. The back mold portion is thinner and allows rapid, non-destructive heating of the polystyrene sufficient to build a large thermal gradient. The thicker front mold portion containing a larger amount of polystyrene would not be heated as rapidly and thereby not produce the same thermal gradient without localized overheating problems.

For this reason, referring to FIG. 4, the hold down 82 and finger 84 are placed between the front mold portion 20 and back mold portion 22. As the lens/mold combination is held, the laser energy is directed in a scanning pattern through the channel 86 in fixture 80 and onto the back mold portion 22.

Heating both mold portions would be possible but would not produce any advantages over heating of the back mold portion 22 only.

It was found that the preferred method for removing the back mold portion from the front mold portion after heating the back mold portion with the laser was to apply a relative tensile force between the mold portions. Referring to FIG. 5, the thin metal fingers 84 which are located underneath the back mold portion flange are machined flat on both sides. The upper part of the fixture 80 is imparted a vertical lifting force so that after exposure of the mold portion to the laser, the fingers 84 pry the back mold portion 22 up.

It was determined that such above-described mechanical assistance was best supplied less than 0.3 seconds after exposure to the radiation. Although no adverse effects would be contemplated if there was less time between exposure and mechanical removal, in practical terms, the time between exposure and mold separation would be between about 0.2 and about 1.5 seconds. Beyond a delay of 1.5 seconds, the difficulties in mold separation and lens removal would be the same as those resulting from underexposure, as described above.

A significant quality consideration and advantage of the present invention is the consistent retention of the lens in the front mold portion when the back mold portion is laser heated and removed in accordance with the above technique.

With reference to the foregoing, the utilization of an X-Y scanner 60 incorporating the galvanometer-driven mirrors 66, 68, facilitates the scanning and application of controlled radiation energy to a plurality of ophthalmic lenses, for example, eight lenses which are contained in molds on a single pallet at a single work station without having to move the pallet, and by simply controlling the motions of the laser spot due to the X-Y displacement of the scanning laser by means of the mirrors, and imparting a predetermined scan pattern to each of the surfaces of the respective lens and mold portions containing the lens.

As can be expected, an increase in lens defects correlates with the occurrence of high energy areas or hot spots in the beam profile. This is expected because overheating in one area weakens the lens, making it prone to tearing, chipping or being pulled away from the front mold portion surface.

With the optimal exposure time and laser scanning, and appropriate demolding mechanism, such as wedge-shaped pry fingers, the mold portions can be separated and the lens can be removed from the mold within approximately 5 seconds.

The above is by way of example for the preferred polystyrene mold system, and as can be readily appreciated by one in the art, the radiation wavelengths, power levels, and exposure times must be approximately adjusted according to the above considerations to achieve optimal characteristics for other lens/mold material systems.

The foregoing scanning laser system 60, although described in connection with the demolding of a plurality of mold portions or ophthalmic lens molds arranged on a stationary pallet, is also capable of being programmed by means of the microprocessor 74 by tracking a moving pallet passing the work station. Furthermore the field intensity over the scan area is programmable and limited only by the spot size and the number of scans, the latter of which, as previously mentioned may provide scan paths as concentric circles, overlapping spirals, circular rasters, among numerous other potential scanning paths.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An apparatus for separating the portions of at least one mold comprised of at least two mold portions including a first mold portion and a second mold portion, containing therein an ophthalmic lens, said apparatus comprising:
    means for positioning the mold portions containing the ophthalmic lens therebetween by holding either or both mold portions at a workstation;
    a source of intense electromagnetic radiation which the material of at least one of the mold portions absorbs sufficiently to cause an increase in the temperature of said material;
    means for directing said radiation from said source to impinge the outer surface of either one or both of said mold portions, said radiation directing means comprising scanner means for tracing predetermined patterns over each surface to vary the amount of radiation energy for different surface areas of each surface; and
    means for controlling the duration of said intense radiation impingement upon the mold portions responsive to said tracing patterns to cause, during said duration of radiation impingement, a controlled rise in the temperature of surface areas of the mold portions so impinged by the radiation from said source.

2. The apparatus as claimed in claim 1, wherein said scanner means comprises a plurality of galvanometer-driven mirrors movable in X-Y orientation, said radiation directing means including optical lens means interposed between said electromagnetic radiation source and said mirrors to focus said radiation into a beam reflected by said mirrors towards said mold portions to facilitate forming of a radiation pattern reducing the energy at thin lens areas or where adsorption of energy by the at least one mold or lens material varies responsive to the presence of an acute surface angle.

3. The apparatus as claimed in claim 2, wherein said plurality of mirrors comprise two said mirrors; a first galvanometer being operatively connected to a first said mirror for driving said mirror in a first orientation; a second galvanometer being operatively connected a second of said mirrors for driving said mirror in a second orientation to provide an X-Y scan pattern.

4. The apparatus as claimed in claim 3, wherein microprocessor means is connected to said galvanometers to impart predetermined controlled actuation to said mirrors.

5. The apparatus as claimed in claim 4, wherein said microprocessor means is computer-controlled.

6. The apparatus as claimed in claim 2, wherein said mirrors are constituted of metal.

7. The apparatus as claimed in claim 6, wherein said metal comprises high energy-resistant beryllium.

8. The apparatus as claimed in claim 1, wherein said scanner means facilitates the sequential scanning of a plurality of said lenses and molds located in a single pallet at said workstation.

9. The apparatus as claimed in claim 1, wherein the source of intense electromagnetic radiation is a laser.

10. The apparatus as claimed in claim 9, wherein said laser facilitates the utilization of a small laser spot for tracing said scan patterns.

11. The apparatus as claimed in claim 10, wherein said laser spot has a diameter of about 0.8 mm.

12. The apparatus as claimed in claim 10, wherein said pattern comprises a spiral pattern traced by said laser spot.

13. The apparatus as claimed in claim 10, wherein said pattern comprises a checkered pattern traced by said laser spot.

14. The apparatus as claimed in claim 1, wherein the radiation has a wavelength of between about 1 $\mu$m and about 20 $\mu$m.

15. The apparatus as claimed in claim 1, wherein said means for positioning holds said first mold portion, thereby holding the second mold portion and the lens attached thereto, and the source of radiation is directed to impinge the outer surface of said second mold portion.

16. A method for separating the portions of at least one mold comprised of at least a first mold portion and a second mold portion, containing therein an ophthalmic lens, said method comprising:

holding at least one of said mold portions in a fixture, thereby holding the mold portions containing the ophthalmic lens therebetween;

directing a source of intense electromagnetic radiation to which the material of at least one of the mold portions is sufficiently absorptive to cause an increase in temperature of said material;

impinging the outer surface of either or both said mold portions with said electromagnetic radiation at a predetermined scanning pattern extending over various surface portions of each said mold portions;

controlling the duration of said radiation impingement while scanning said surface patterns with said radiation to cause during said duration of radiation impingement, a rise in the temperature of the surface of the mold portion impinged by the intense electromagnetic radiation, but essentially no rise in the temperature of the ophthalmic lens; and separating the mold portions after being so impinged.

17. The method as claimed in claim 16, wherein said scanning pattern facilitates the formation of a radiation pattern reducing the energy at thin lens areas or where absorption of energy by the mold or lens material varies responsive to the presence of an acute surface angle.

18. The method as claimed in claim 16, wherein there is facilitated the sequential scanning of a plurality of said lenses and molds while located in a single pallet.

19. The method as claimed in claim 16, wherein said electromagnetic radiation comprises laser energy.

20. The method as claimed in claim 19, wherein said laser energy has a wavelength of between about 1 $\mu$m and 20 $\mu$m.

21. The method as claimed in claim 20, wherein said laser spot traces said surface in a checkered scanning pattern.

22. The method as claimed in claim 20, wherein said laser spot has a diameter of about 0.8 mm.

23. The method as claimed in claim 20, wherein said laser spot traces said surface in a spiral scanning pattern.

24. The method as claimed in claim 19, wherein said laser energy comprises a focused laser spot.

25. The method as claimed in claim 24, wherein said laser spot is formed by a laser beam directed by movable galvanometer-driven mirrors.

26. The method as claimed in claim 25, wherein said galvanometer-driven mirrors are controlled by a microprocessor so as to implement an X-Y scanning pattern motion.

27. The method as claimed in claim 16, wherein said first mold portion is held in said fixture, said electromagnetic radiation is directed to said second mold portion which is then impinged with electromagnetic radiation, and said separation is by applying a tensile force between said second mold portion and said first mold portion.

28. The method as claimed in claim 16, wherein the first mold portion held in said fixture is that forming the front surface of the ophthalmic lens, and the second mold portion impinged by the electromagnetic radiation is that forming the back surface of the ophthalmic lens.

29. The method as claimed in claim 16, wherein said first mold portion is held in said fixture, said electromagnetic radiation is directed to said second mold portion which is then impinged with electromagnetic radiation, and said separation is by the prying away of said second mold portion from said first mold portion and the lens.

* * * * *